Figure 1:
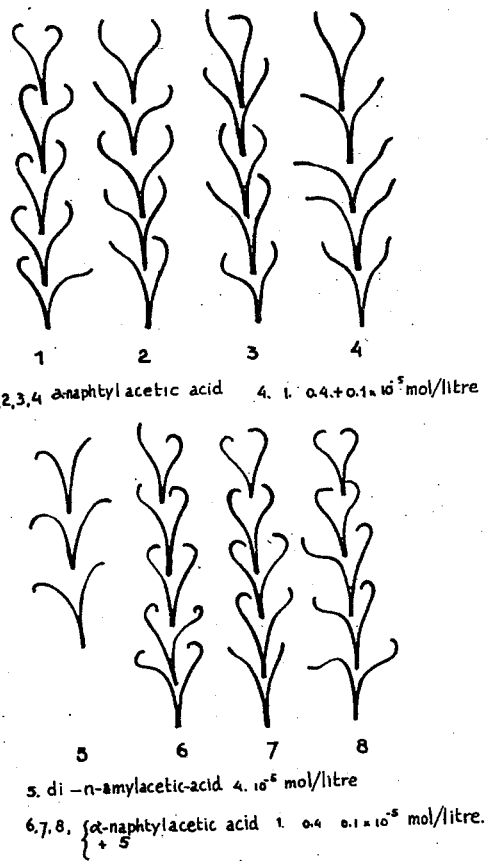

May 26, 1953     H. VELDSTRA     2,639,983
GROWTH PROMOTING PREPARATIONS FOR PLANTS
Filed April 30, 1949     2 Sheets-Sheet 1

INVENTOR
HAAYE VELDSTRA

May 26, 1953 H. VELDSTRA 2,639,983
GROWTH PROMOTING PREPARATIONS FOR PLANTS
Filed April 30, 1949 2 Sheets-Sheet 2

1,3,5,7 α-naphtylacetic acid  4. 2. 1. 0.4 x 10⁻⁵ mol/litre
2,4,6,8 idem + 4.10⁻⁵ mol/litre decalylacetic acid

INVENTOR
HAAYE VELDSTRA
BY
ATTORNEY

Patented May 26, 1953

2,639,983

UNITED STATES PATENT OFFICE 2,639,983

GROWTH PROMOTING PREPARATIONS FOR PLANTS

Haaye Veldstra, Amsterdam, Netherlands, assignor to N. V. Amsterdamsche Chininefabriek, Amsterdam, North Holland, Netherlands, a company of the Netherlands Application April 30, 1949, Serial No. 90,752
In the Netherlands May 3, 1948

9 Claims. (Cl. 71—2.5)

This invention relates to improvements in the manufacture of growth promoting preparations for plants.

Up to the present time the compounds which are highly active growth promoting substances for plants have almost exclusively been used singly, for any given application those individual compounds having been selected which yield the maximum effect in that application. Thus, in the case of the root formation of cuttings, indoleacetic acid, indole-butyric acid and naphthylacetic acid are used and for the induction of parthenocarpy preferably β-naphthoxyacetic acid or 2:4-dichloro-phenoxyacetic acid (in very low concentrations), while the premature dropping of fruit is prevented with solutions of the potassium salt of naphthylacetic acid. It may be mentioned that the undesirable sprouting of stored potatoes may be prevented with naphthylacetic acid methyl ester, and that certain weeds are combatted with 2:4-dichloro-phenoxyacetic acid (in higher concentrations).

The activity of mixtures of the more highly active growth promoting substances has not so far been studied to any great extent (cf. Hitchcock and Zimmermann, Contrib. Boyce Thomp. Inst. 11, 143 (1940) and in practice such mixtures have not yet gained any particular importance.

In 1939 Went (Proc. Kon. Akad. Wetensch. Amsterdam 42, 581, 731 (1939)) reported that in the pea test a preliminary treatment with solutions of phenylbutyric acid has for a result that smaller quantities of an active compound, such as indole-acetic acid or naphthylacetic acid, are sufficient in order to attain a given growth promoting effect, while the activity of weak growth promoting substances, such as indolepropionic acid or cis-cinnamic acid, can be increased by this preliminary treatment. Phenylbutyric acid per se has no growth promoting effect.

Went used this compound in a concentration which was rather high for the pea test (100 mg./litre=60×$10^{-5}$mol/litre).

Skoog (Am. J. Bot. 29, 568 (1942)) examined the effect of mixtures of indole-acetic acid and phenylbutyric acid in the Avena test and in the cylinder test, and concluded that in the concentration region examined by him it is chiefly a checking of the indole-acetic acid effect which occurs (vide the Summary on page 575).

The present invention is based on the observation that excellent plant growth promoting preparations are obtained when there is mixed with a growth promoting substance another compound which acts as a synergist, namely a monocarboxylic acid differing from the growth promoting substance used, which acid contains an aliphatic, hydro-aromatic, aromatic or araliphatic hydrocarbon radical such that the total number of carbon atoms in the molecule is 10–16 in the case of either of the first two radicals mentioned and 11–16 in the case of either of the last two. The compounds used as synergists have themselves no or only a slight growth promoting effect. As appears from the tests, the optimum of the activity of these synergists lies at a molecular size corresponding to 11–14 carbon atoms; the compounds having a total number of 11 or 12 carbon atoms in the molecule were found to be the most effective. Preparations comprising lower carboxylic acids of the indole series in conjunction with such of the naphthalene and/or anthracene series are excluded.

This surprising synergetic effect is turned to account in accordance with the present invention in two ways.

According to one feature of the present invention a growth promoting preparation comprises a synergist of the type described incorporated with one of the more highly active growth promoting substances, that is a substance the activity of which is such as to have hitherto justified its use alone. In this case a more highly active growth promoting substance can be used in a considerably lower concentration than is otherwise required for an optimum effect, the addition of a carboxylic acid of the group referred to having the effect that the activity of the preparation as a whole is brought to a level which may even be higher than the maximum that can be attained with the growth promoting substance alone.

According to a further feature of the invention a growth promoting preparation comprises a synergist of the type described incorporated with a weak growth promoting substance, that is a substance not having sufficient growth promoting activity to justify its use along in normal circumstances. In this case the effect of the growth promoting substances which by themselves are of low activity is enhanced with the production again of highly active preparations.

In both cases a considerable economy can be effected. In general it is the highly active growth promoting substances which are most difficult to produce. As a rule the synergists can be produced more readily than the highly active growth promoting substances.

The carboxylic acids which act as synergists may themselves have a weak growth promoting effect or they may be inactive. Examples are: α- and β-naphthylbutyric acid, completely hydrogenated derivatives of growth promoting substances, such as decalylacetic acid, and the normal and branched fatty acids with the number of carbon atoms referred to above. Of the branched fatty acids particular mention may be made of substituted acetic acids, such as di-n-amylacetic acid, di-n-hexylacetic acid, di-n-heptylacetic acid, tri-n-propylacetic acid, and their isomers, and also those with a partial cyclic structure (isocyclic, including aromatic), e. g. dibenzylacetic acid. Some other examples are: di-n-butylacetic acid, di - (2 - methyl - butyl - 1) acetic acid, di-(3-methyl-butyl-1) acetic acid, di-(cyclohexyl-methyl) acetic acid.

Of particular value as synergists are organic monocarboxylic acids as above specified the molecular size of which is of the same order as that of the highly active growth promoting substances.

Growth promoting components of the mixtures to be produced according to the invention may be, for example: highly active growth promoting substances, such as indole-acetic acid, indole-butyric acid, naphthylacetic acid or dichlor-2:4-phenoxyacetic acid; or growth promoting substances which are less active, e. g. naphthyl-butyric acids, indole-propionic acid or phenyl-acetic acid. Various derivatives of these substances, such as salts (for example the alkali metal or ammonium salts), esters (for example the methyl or ethyl esters) and amides, can also be used.

The synergists can also be used in the form of derivatives substituted in the carboxyl group, e. g. as salts, amides, esters. The choice depends on the purpose for which the preparation according to the invention is to be used.

The proportion between the concentrations of growth promoting substance and synergist may vary within wide limits. In general it is to be preferred to ascertain by means of a test what proportion of the components is most desirable for the given substances and for a given purpose. Excellent results have been attained, for example, with $x$ mol/litre of synergist with the use of $x$ to $0.05x$ mol/litre of growth promoting substance in those cases where the growth promoting substance alone would be used in a concentration of $x$ mol/litre or more. From this it may also be concluded that the order of the concentration of the preparations may be approximately identical with that which is used in the case of the growth promoting substances alone.

The mixtures may be applied in the usual manner, i. e. for example in solution (for example in an aqueous solution) or on a solid carrier (for example on talcum or bolus alba); they can also be sprayed as aerosols.

The accompanying drawings illustrate the results of tests set forth in the mentioned examples.

Figure 2:
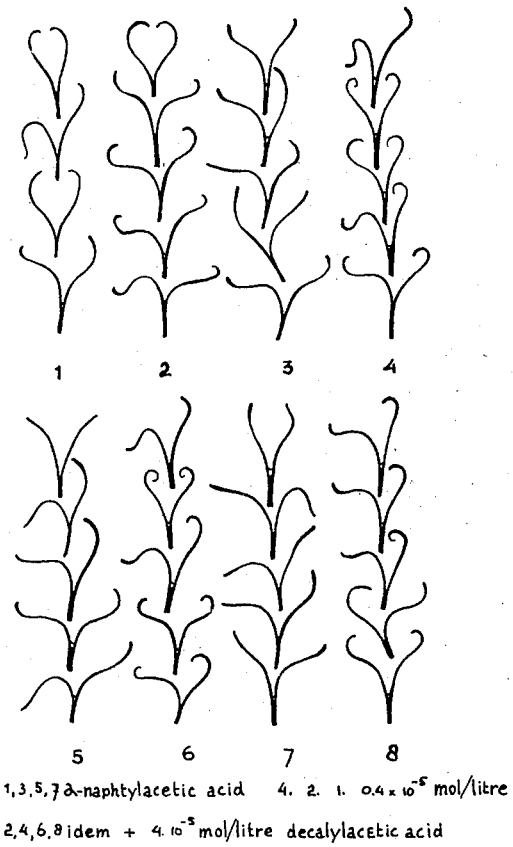

In the drawings:

Fig. 1 shows the results of "Example I" and Fig. 2 shows the results of "Example II."

Referring to the drawings and the legends thereon in detail, and first to the showing in Fig. 1, the solutions employed in the experiments are as follows:

In experiments designated 1, 2, 3 and 4: a solution of α-naphthyl acetic acid in a concentration of $4\times10^{-5}$, $1\times10^{-5}$, $0.4\times10^{-5}$ and $0.1\times10^{-5}$ moles/litre respectively. In experiment designated 5: a solution of di-n-amylacetic acid in a concentration of $4\times10^{-5}$ moles/litre. In experiments 6, 7 and 8: a solution of α-naphthyl acetic acid in a concentration of $1\times10^{-5}$, $0.4\times10^{-5}$ and $0.1\times10^{-5}$ moles/litre respectively, each in combination with di-n-amyl acetic acid in a concentration of $4\times10^{-5}$ moles/litre.

The activity of each of the foregoing solutions is investigated by means of the well-known pea test, the results of which are shown on the drawings.

In Fig. 1 experiments 2 and 6, 3 and 7, 4 and 8 should be compared. Experiment 1 shows the activity of α-naphthyl acetic acid in a concentration of $4\times10^{-5}$ moles/litre. It follows from a comparison of experiments 1 and 6 that a combination of α-naphthyl acetic acid in a concentration of $1\times10^{-5}$ mol/litre and di-n-amylacetic acid in a concentration of $4\times10^{-5}$ mol-litre has a greater activity than α-naphthyl acetic acid alone in a concentration of $4\times10^{-5}$ mol-litre. The activity of the solutions in experiments 1 and 7 is about the same.

Experiment 5 shows that the synergist di-n-amyl acetic acid has no appreciable activity in the pea test, if any.

In Fig. 2 experiments 1 and 2, 3 and 4, 5 and 7, 7 and 8 should be compared, the even numbers showing the influence of the synergist.

The solutions employed in the experiments illustrated in Fig. 2 are as follows:

In experiments designated 1, 3, 5 and 7: a solution of α-naphthyl acetic acid in a concentration of $4\times10^{-5}$, $2\times10^{-5}$, $1\times10^{-5}$ and $0.4\times10^{-5}$ moles/litre respectively.

In experiments designated 2, 4, 6 and 8: a solution of α-naphthyl acetic acid in a concentration of $4\times10^{-5}$, $2\times10^{-5}$, $1\times10^{-5}$, and $0.4\times10^{-5}$ moles/litre respectively, each in combination with decalyl acetic acid in a concentration of $4\times10^{-5}$ moles/litre.

The activity of each of the solutions employed in the experiments shown in Fig. 2, as in the case of the solutions employed in the experiments shown in Fig. 1, is investigated by means of the well known pea test.

The examples previously referred to which illustrate the invention are as follows:

Example I

For purposes of comparison solutions in water were made of α-naphthylacetic acid in concentrations of 4, 1, 0.4 and $0.1\times10^{-5}$ mol/litre, and a solution of di-n-amylacetic acid in a concentration of $4\times10^{-5}$ mol/litre.

Preparations according to the present invention were made consisting of such mixtures of α-naphthylacetic acid and di-n-amylacetic acid as contain 1, 0.4 and $0.1\times10^{-5}$ mol/litre of naphthylacetic acid and in each case $4\times10^{-5}$ mol/litre of di-n-amylacetic acid. In the so-called pea test the activities of these solutions were compared. It was found that whereas the solution of $0.1\times10^{-5}$ mol/litre of naphthylacetic acid alone is only very slightly active ($4\times10^{-5}$ mol/litre is the optimum in this case) and di-n-amylacetic acid itself has no growth promoting effect in the above concentration, of the mixed solutions even that containing the smallest of the above quantities proved to have at least the same activity as α-naphthylacetic acid alone in a concentration $40\times$ stronger, and was found to exceed this activity in some cases. This can be seen from Fig. 1.

Example II

Corresponding tests were carried out with solutions of α-naphthylacetic acid as growth promoting substance in concentrations of 4, 2, 1 and $0.4 \times 10^{-5}$ mol/litre, a solution of decalylacetic acid in a concentration of $4 \times 10^{-5}$ mol/litre, and solutions according to the present invention of such mixtures of α-naphthylacetic acid and decalylacetic acid as synergist as contained 4, 2, 1 and $0.4 \times 10^{-5}$ mol/litre of α-naphthylacetic acid and in each case $4 \times 10^{-5}$ mol/litre of decalylacetic acid.

It is well known that the synergists are less expensive than the growth substances.

It was found in all cases that the solution containing the mixture of growth promoting substance and synergist was appreciably more active than the solution of the same concentration of the growth promoting substance alone. The mixed solution with the lowest concentration of α-naphthylacetic acid was appreciably more active than the most concentrated solution of the said growth promoting substance alone. This can be seen from Fig. 2.

What I claim is:

1. A preparation for promoting plant growth comprising a substance having the capacity to promote plant growth chosen from the group consisting of indole acetic acid, indole butyric acid, naphthyl acetic acid, dichloro-2,4-phenoxy acetic acid and naphthyl butyric acid with which is incorporated a compound chosen from the group consisting of a dialkyl acetic acid, its alkalimetal salts, its ammonium salt, its amide and its esters such that the total number of carbon atoms of the acid is 10–16.

2. A preparation as claimed in claim 1 in which the substance having the capacity to promote plant growth consists of indole acetic acid.

3. A preparation as claimed in claim 1 in which the substance having the capacity to promote plant growth consists of indole butyric acid.

4. A preparation as claimed in claim 1 in which the substance having the capacity to promote plant growth consists of naphthyl acetic acid.

5. A preparation as claimed in claim 1 in which the substance having the capacity to promote plant growth consists of dichloro-2,4-phenoxy acetic acid.

6. A preparation as claimed in claim 1 in which the substance having the capacity to promote plant growth consists of naphthyl butyric acid.

7. A preparation as claimed in claim 1 in which the ratio of the substance having the capacity to promote plant growth to the said compound incorporated therewith is from (0.05–1) to 1, calculated in moles.

8. A preparation as claimed in claim 1 in aqueous solution.

9. A preparation as claimed in claim 1 on a solid carrier.

HAAYE VELDSTRA.

References Cited in the file of this patent

UNITED STATES PATENTS

| Number | Name | Date |
|---|---|---|
| 2,284,970 | Avery | June 2, 1942 |
| 2,289,974 | Leiby | July 14, 1942 |
| 2,394,916 | Jones | Feb. 12, 1946 |
| 2,446,836 | King | Aug. 10, 1948 |

OTHER REFERENCES

Article by Went in Proc. Kon. Akad. Wetensch. Amsterdam, vol. 42, pages 581, 731 (1939).

Contrib. Boyce Thompson Inst.—vol. 10 (July-September 1939), pages 481 to 508.